United States Patent [19]

Hamilton et al.

[11] Patent Number: 4,635,992
[45] Date of Patent: Jan. 13, 1987

[54] MOVEABLE VEHICULAR STORAGE BOX

[76] Inventors: Gene Hamilton, 118 Market Ave.; Gale Hawkins, 592 Adams; Lynn R. Potthast, 103 Skylane Mobile Park, all of Twin Falls, Id. 83301

[21] Appl. No.: 665,440

[22] Filed: Oct. 26, 1984

[51] Int. Cl.$^4$ ............................................. B60P 1/52
[52] U.S. Cl. ........................... 296/37.6; 224/273; 312/DIG. 33
[58] Field of Search ............... 296/37.6, 37.1, 37.5; 224/273, 310; 312/DIG. 33, 276, 323; 280/769; 217/57; 160/118

[56] References Cited

U.S. PATENT DOCUMENTS

| | | | |
|---|---|---|---|
| 1,731,325 | 10/1929 | Stevens | 217/57 X |
| 1,998,599 | 4/1935 | Weber | 217/57 X |
| 2,674,967 | 4/1954 | Bich et al. | 160/118 X |
| 2,784,027 | 3/1957 | Temp | 296/37.6 X |
| 3,249,382 | 5/1966 | Swithenbank | 294/24 R |
| 3,640,423 | 2/1972 | Parker et al. | 220/31 R |
| 3,826,529 | 7/1974 | Wood | 296/37.6 |
| 3,837,722 | 9/1974 | Ceccarelli | 312/323 X |
| 3,854,621 | 12/1974 | Parry | 220/20 |
| 4,085,987 | 4/1978 | Vartdal | 312/DIG. 33 |
| 4,288,011 | 9/1981 | Grossman | 224/42.42 |
| 4,320,852 | 3/1982 | Nagelkirk | 312/276 X |
| 4,488,669 | 12/1984 | Waters | 224/273 |
| 4,507,033 | 3/1985 | Boyd | 410/130 X |
| 4,522,326 | 6/1985 | Tuorby, III | 296/37.6 X |
| 4,531,774 | 7/1985 | Whatley | 296/37.6 |

Primary Examiner—David A. Scherbel
Assistant Examiner—Russell D. Stormer
Attorney, Agent, or Firm—Frank J. Dykas

[57] ABSTRACT

A storage box is suspended on side rails in such a manner that it can be slid along the length of the cargo compartment of a conventional pickup truck bed, conventional pickup truck bed with a camper shell or a cargo van. The storage box can be easily opened from the front or rear of the cargo bed. The top panel can be completely removed from the storage box while it is held in a confined space with limited headroom.

5 Claims, 5 Drawing Figures

MOVEABLE VEHICULAR STORAGE BOX

BACKGROUND OF THE INVENTION

The field of invention relates to a vehicular storage box of a type that is commonly used with the conventional pickups and cargo vans for the storage of tools, shop supplies and other miscellaneous types of small items. These boxes are used with conventional pickup trucks because lockable storage space is at a premium.

The boxes are used to store carpenter's tools or other types of tools and supplies which a mechanic, technician, carpenter or laborer or the like may need to have at a job site remote from the headquarters office or plant. In the typical installation the tool box is mounted at the forward end of the pickup bed, adjacent to the front panel. The reason for this is quite obviously, to allow for as much storage space in the pickup bed as possible for longer items such as lumber, ladders, wheelbarrows or other types of tools or perhaps cargo storage such as barrels of materials or boxes.

In order to have easy access to the contents of this storage box the boxes are almost universally designed to be open from either or both sides of the pickup bed. In this way the person using the tool box need not climb into the pickup bed each and every time he desires to bet something out of the box, but merely stands at the side and opens up that particular top panel.

The problem with the conventional storage boxes is the dilemma created by the method of gaining access to the storage box. If it opens from the side, then the box cannot be used inside of an enclosed trade van, nor can it be used in a pickup truck wherein the pickup truck is equipped with a camper shell or the like.

SUMMARY OF THE INVENTION

Accordingly it is an object of this invention to provide a storage box which is suspended on side rails in such a manner that the storage box can be slid along the length of the cargo compartment, being it either a conventional pickup truck bed, conventional pickup truck bed with camper shell or cargo van.

Another object of this invention to provide a storage box which can be easily opened from the front or rear while stored or positioned in a confined space wherein access from the side is precluded.

It is an additional object of this invention to provide a storage box wherein the top panel can be completely removed from the storage box while the same is held in a confined space with limited headroom.

These objects are accomplished by means of the use of side rails which are affixed to the inside side panels of the pickup truck bed or cargo van storage area in parallel spaced relationship one to the other at a height convenient to suspend a conventional appearing storage box between them at a height sufficient to clear obstacles such as wheel wells or the like. The storage box has affixed to its sides mounting means, typically roller casters which can be attached to channels formed in the side rails to hold or suspend the storage box above the pickup bed.

Holes are provided in the side rails through which locking pins can be inserted to hold the storage box at a polarity of different, predetermined, positions along the length of the side rails.

The storage box is further adapted for use in a confined space in that access to the storage box is through the top panel. The top panel is hinged by means of two side arms disposed in parallel spaced relationship between the side collars of the top panel and the side panels of the storage box and rotateably pinned at one end of the side collars and rotateably pinned at the other end to the side panel and positioned wherein the end of the side arms will fall outside of the front or rear panel of the storage box when the side arms are rotated 180° in an upwardly direction away from the storage box. In this manner the top panel can be completely removed from the storage box with a minimum of vertical clearance required.

DETAILED DESCRIPTION OF THE PREFERRED EMBODIMENTS

Figure 1:
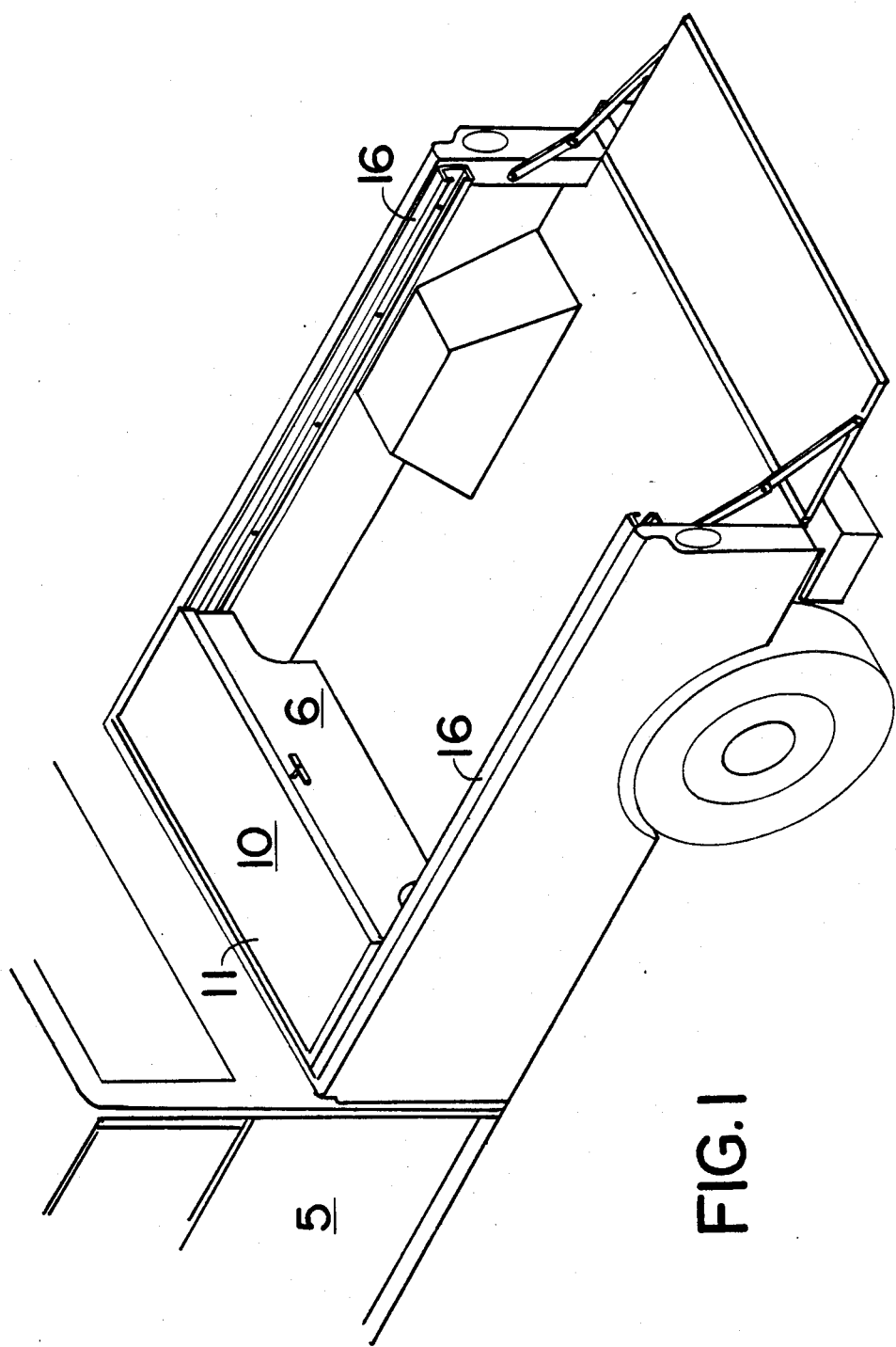
FIG. 1 is a perspective view showing the slideable storage box mounted on rails in the rear of a conventional pickup truck bed.
Figure 5:
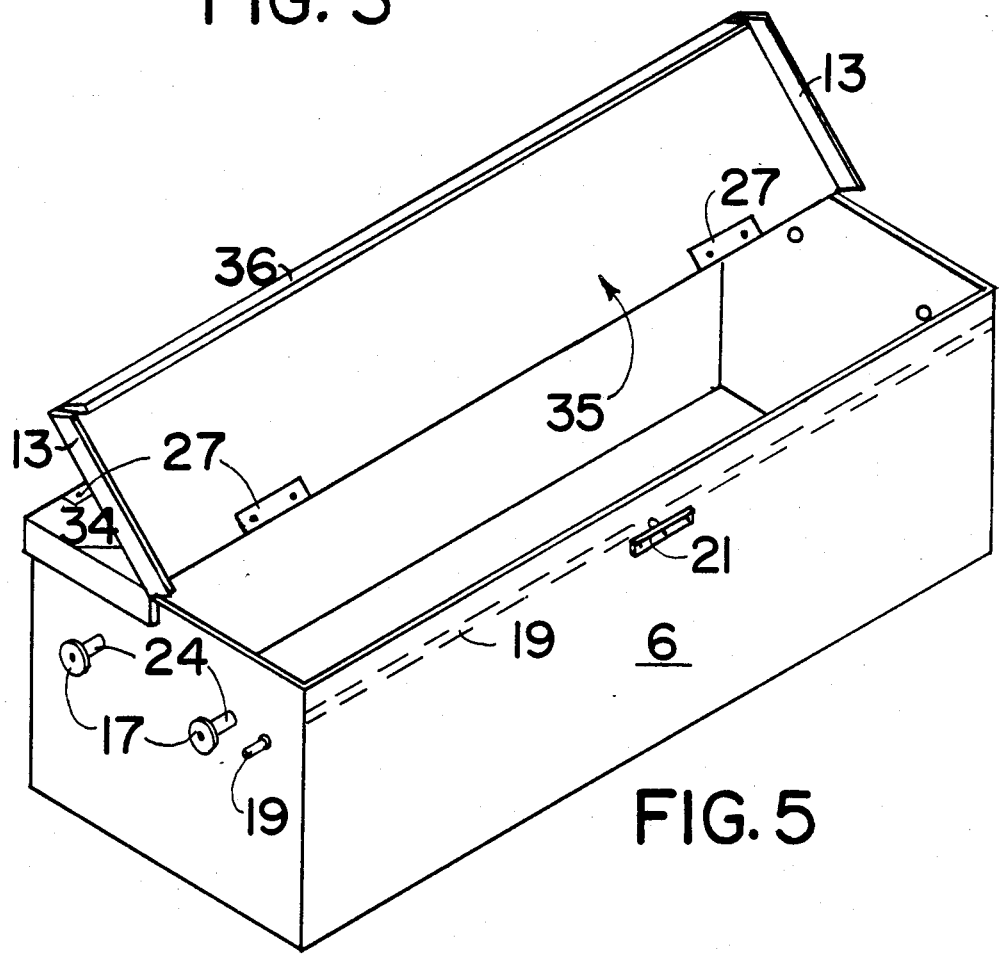
FIG. 5 is a perspective view of a third embodiment of the storage box and top panel.

First referring to FIG. 1 conventional pickup truck 5 is shown to advantage with the storage box 10 installed and supported by side rails 16. It can be seen that storage box 10 is suspended by means of mounting means 17, as shown in FIGS. 4 and 5, affixed to side rail 16 in such a manner that storage box 10 can be slid along the length of the pickup truck bed from what would be considered a storage position at the front of the bed all the way to the rear where access to the storage box would be relatively easy to obtain.

Figure 3:
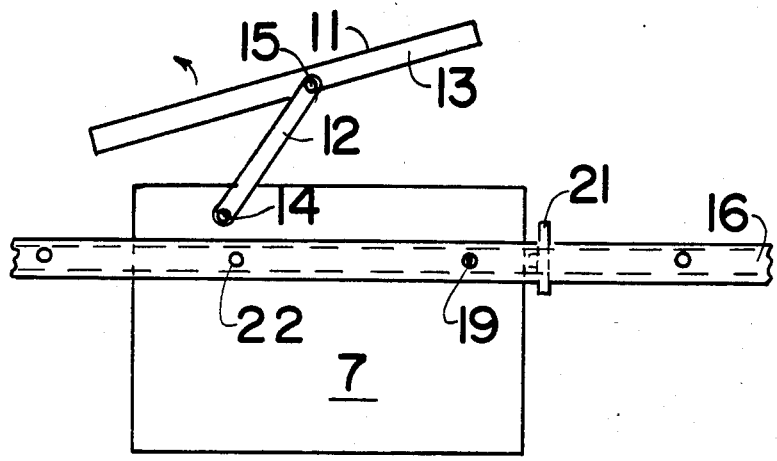
FIG. 3 is a side view showing side arm hinging of top panel.
Figure 4:
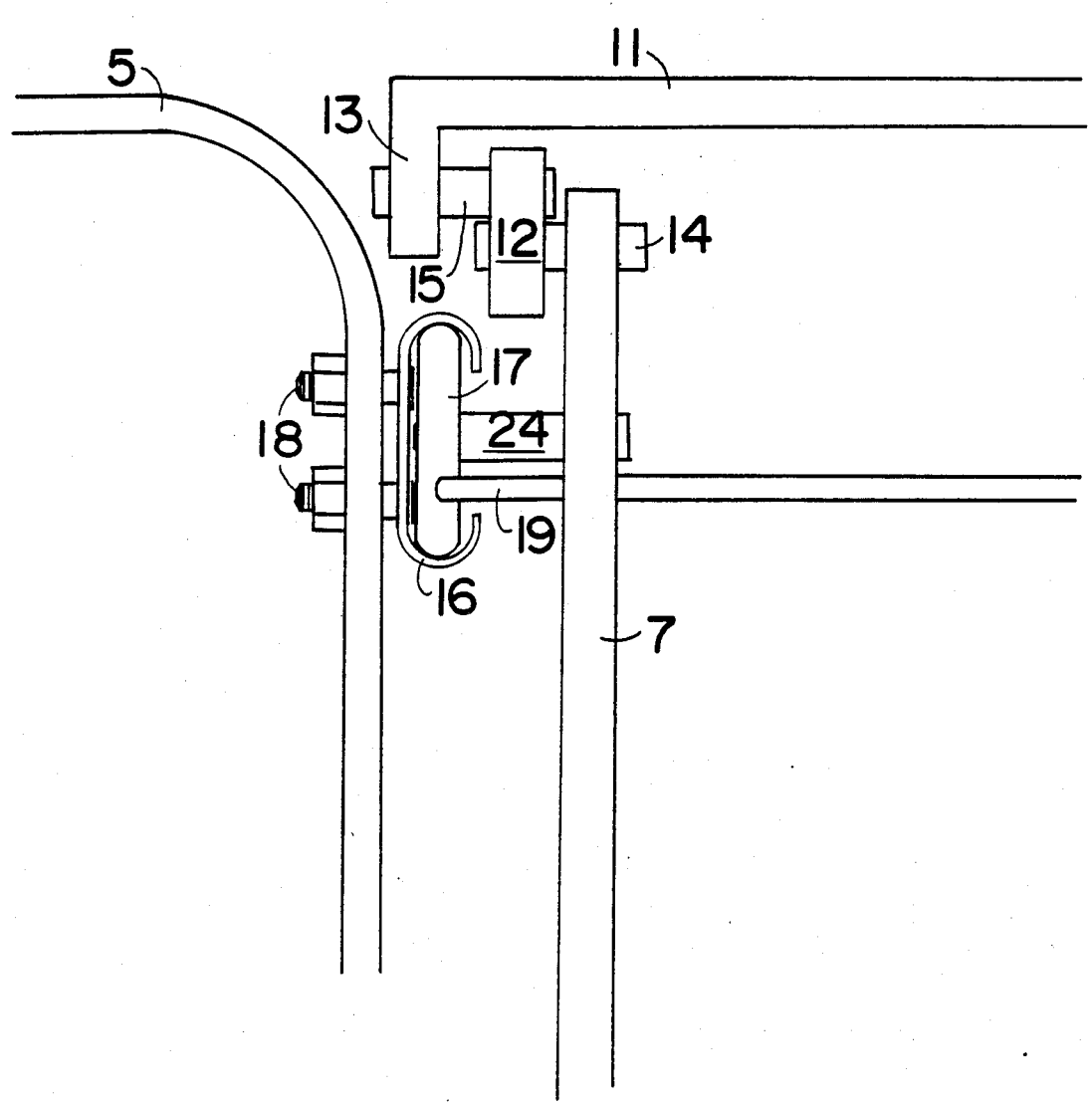
FIG. 4 is a sectional view of the side arms hinging on the top panel, and slideable connection of the storage box to the side rails.

An embodiment for removing the top panel 11 so as to gain access to storage box 10 is shown to advantage in FIGS. 3 and 4. In this embodiment of the invention top panel 11 is attached to storage box 10 by means of side arms 12. One end of each side arm 12 is rotateably pinned to side collars 13. The other end of side arms 12 are rotateably pinned to the left and right side panels 7 and 8 of storage box 10. The location of pins 14 is such that when side arms 12 are rotated up and around the pivot point of pins 14 the pin connecting side arms 12 to side collars 13 will, when the side arms are rotated 180° around fall outside of the front or rear panel of storage box 10. The side arms 12 are disposed between the side panel 7 and 8 and side collars 13 as shown in FIG. 4.

Figure 2:
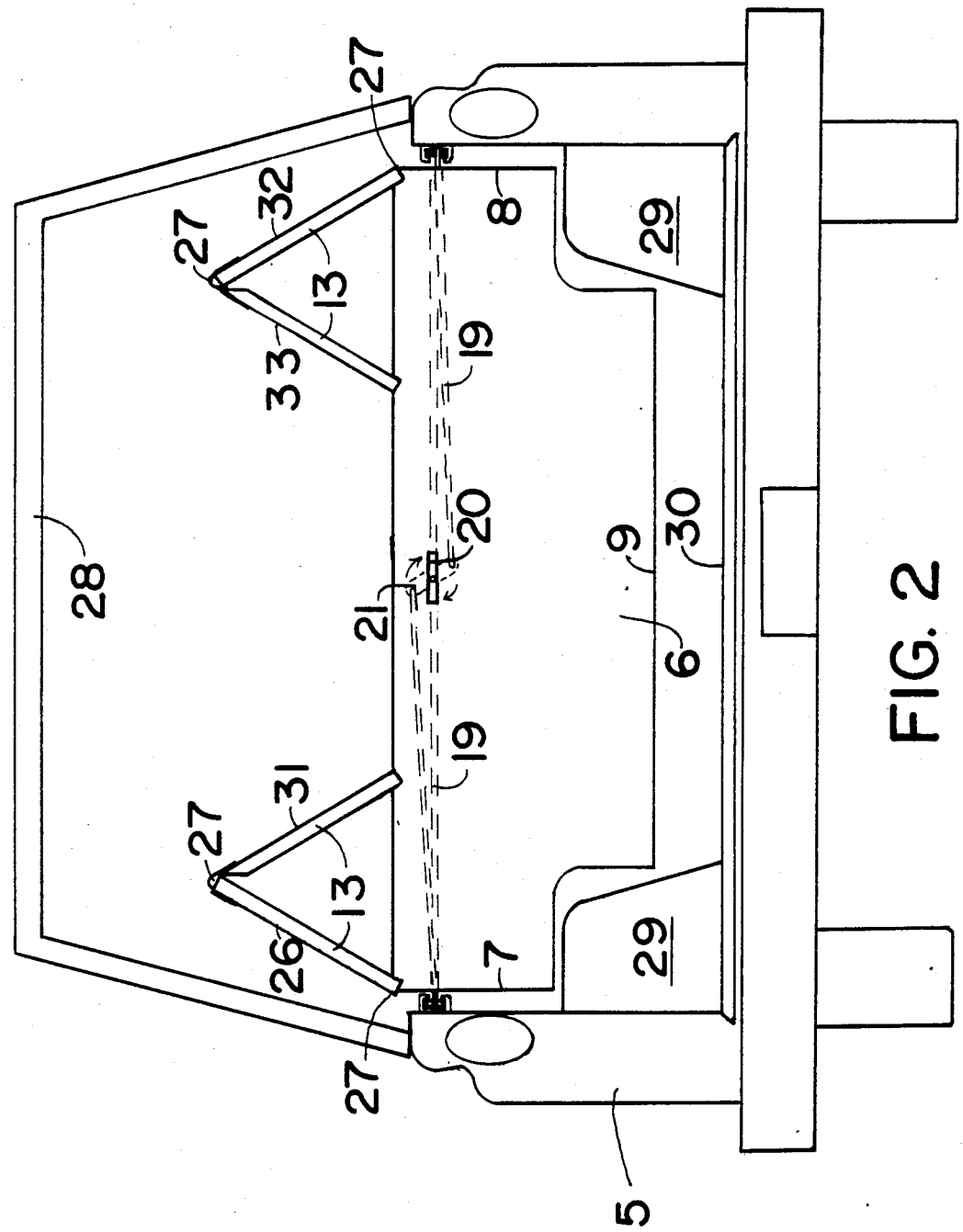
FIG. 2 is a end view of a second embodiment of the storage box mounted inside a pickup truck bed having affixed to it a camper shell.

Next referring to FIG. 2, pickup truck 5 has installed upon it what is commonly known as a camper shell 28. The camper shell 28 as is shown in FIG. 2 has sloping sidewalls which functionally limit the amount of headroom available for opening the top of storage box 10. Storage box 10 is shown at a rear position where an access would be attainable to the contents of the storage box. The storage box is of conventional shape having bottom panel 9, left side panel 7, right side panel 8 and rear panel 6 facing to the rear of the pickup truck and a front panel, not shown. In this embodiment of the invention access is gained through four top quarter panels. The first left top quarter panel 26 utilizes hinges 27 to affix it to the left side panel 7 of storage box 10.

Hinged, again by means of a hinges 27 to the opposite side of first left top quater panel 26 is the second left top quarter panel 31.

In corresponding relationship on the right side of the storage box 10 we find right quarter panel 32 is hinged by means of hinges 27 to the right side panel 8 of storage box 10. Hinged to the opposite side of the first right top quarter panel 32, by means of hinges 27 is second right top quarter panel 33.

A similar top panel arrangement as shown in FIG. 5 wherein the top panel is comprised of the front top plate 34 and rear top plate 35 wherein the front top plate 34 is hinged to the front panel of storage box 6 by means of hinges 27, and the rear top plate 35 is hinged to front top plate 34.

In both the quarter panel arrangement of FIG. 2 and half panel arrangement of FIG. 5, hinges 27 allow for free rotation of the panels to a maximum of approximately 340°. FIG. 5 also shows to advantage a feature which allows the operator to open the top plates 34 and 35, either by folding over front arm rear top plates 34 and 35, or in a scissors action similar to that which is shown in FIG. 2. This can be accomplished because the front lip 36 of rear top plate 34 is cut off in such a manner so as to define slots between side collars 13 and front lip 36, through which the top edges of side panels 7 and 8 can be slid.

Again referring to FIG. 2 the storage box 10 is suspended above the pickup truck bed 30 at a height sufficient so that the storage box 10 will clear wheel wells 29. In the preferred embodiment bottom plate 9 of storage box 10 is adapted to conform to the shape of the pickup bed. It should be apparent that the number of modifications to the shape of bottom panel 9 can be made.

Next, referring to FIG. 4, side rails 16 are channels which cradle casters 17. Side rails 16, as is shown in FIG. 4 are attached to the side of the pickup bed, 5 by means of fastener screws 18.

Casters 17 are rotateably mounted on shafts 24 in such a manner as to allow free rotation and travel of casters 17 along the entire length of side rails 16. There are a number of well known means of mounting casters 17 on shafts 24 so as to allow some lateral travel of casters 17 on shafts 24, these include bushings and spring loading casters 17 against thrust washers. In this manner minor variations in the distance between the two parallel slide rails 16 can be compensated for and still provide free and easy movement of cargo box 10 along the entire length of side rails 16.

Locking pins 19 as shown in FIGS. 2, 3, 4 and 5 are attached to lever 20 and provided for insertion into holes 22 found in side rails 16 so as to lock the storage box 10 at predetermined locations along the length of side rails 16. In this manner the entire storage box can be slid to a storage position in the forward part of the pickup bed, as shown in FIG. 1 and locked there by means of inserting locking pins 19 through holes 22 so as to prevent the storage box from moving from its storage position. A polarity of holes 22 are provided in slide rails 16 so as to allow the storage box to be locked in any number of positions. To unlock the storage box the operator turns handle 21, thus rotating lever 20 which draws pins 19 from holes 22; to lock it, the operator and reverses the procedure.

While there is shown and described the present preferred embodiment of the invention, it is to be distinctly understood that the invention is not limited thereto but may be variously embodied to practice within the scope of the following claims. Accordingly,

What we claim is:

1. A storage container for vehicles having a cargo compartment having limited headroom and defined by opposite sloping side walls, a front wall a roof and a floor, said storage container comprising:
    (a) Side rail means attached to said opposite side walls in parallel relationship one to the other; and
    (b) A front panel, rear panel, left and right side panels and bottom panels of conforming size and shape to define a storage box which can be slid from a storage position in close proximity to the front wall of the cargo compartment to the rear of said cargo compartment; and
    (c) Mounting means attached to said storage box and slideably engaged with said side rails; and
    (d) A top panel; and
    (e) Top panel mounting means for removeable engagement of said top panel with the storage box and for holding said top panel in a position of non-engagement with the sloping side walls and the roof of the cargo compartment when so removed.

2. The storage container of claim 1 wherein said top panel further comprises:
    (a) top plate;
    (b) two side collars attached to said top plate and extending downwardly in parallel spaced relationship with the side panels of the storage box; and
    (c) two side arms disposed in parallel spaced relationship between the side collars and the side panels and rotatably pinned at one end to the side collars, and rotatably pinned at the other end to the side panels in a position wherein the end of the side arms attached to the side collars will fall outside of the front or rear panel of the storage box when the side arms are rotated 180° about the ends pinned to the side panels in an upwardly direction away from the storage box.

3. The storage container of claim 1 wherein said storage box further comprises:
    first and second top plates, each spanning from side panel to side panel for being supported thereon and each covering a separate portion of the opening defined by the front, rear and side panels of the storage box, with the first top plate hinged at the top of either the front or rear panel, and the second top plate hinged to the side of the first top plate opposite the side of the first top plate hinged to the front or rear panel.

4. The storage container of claim 1 wherein said storage box further comprises:
    (a) first and second left top plates and first and second right top plates each spanning from front panel to rear panel for being supported thereon and each covering a separate portion of the opening defined by the front, rear, left and right side panels of the storage box,
    with the first left and first right top plates being hinged to the top of their respective left side panel and right side panel,
    and the second left and second right top plates hinged the first left plat and first right plate respectively so that the second left and right plates may be folded over onto the first left and right plates respectively, or drawn upwardly from the hinged side of said second left and right plates when the first left and first right plates are rotated outwardly from the storage box.

5. The storage container of claim 1 wherein said apparatus further comprises:
   locking means for fixing the position of the storage box at a plurality of different positions along the length of the cargo compartment spanned by said side rails means.

* * * * *